US012375133B2

(12) United States Patent
Gheorghiu et al.

(10) Patent No.: US 12,375,133 B2
(45) Date of Patent: Jul. 29, 2025

(54) ENHANCEMENTS FOR NON-COLLOCATED INTRA-BAND DEPLOYMENTS

(71) Applicant: QUALCOMM Incorporated, San Diego, CA (US)

(72) Inventors: Valentin Alexandru Gheorghiu, Yokohama (JP); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 18/448,767

(22) Filed: Aug. 11, 2023

(65) Prior Publication Data
US 2024/0056134 A1    Feb. 15, 2024

Related U.S. Application Data

(60) Provisional application No. 63/398,214, filed on Aug. 15, 2022.

(51) Int. Cl.
| | | |
|---|---|---|
| *H04B 7/0413* | (2017.01) | |
| *H04L 5/00* | (2006.01) | |
| *H04L 27/26* | (2006.01) | |

(52) U.S. Cl.
CPC .......... *H04B 7/0413* (2013.01); *H04L 5/001* (2013.01); *H04L 27/2607* (2013.01)

(58) Field of Classification Search
CPC .... H04B 7/0413; H04L 5/001; H04L 27/2607
See application file for complete search history.

(56) References Cited

U.S. PATENT DOCUMENTS

| | | | | |
|---|---|---|---|---|
| 2013/0106657 | A1* | 5/2013 | Perthold ................... | G01S 5/04 342/387 |
| 2015/0131749 | A1* | 5/2015 | Slomina .............. | H04L 27/2647 375/260 |

(Continued)

OTHER PUBLICATIONS

Ericsson: "Discussion on General RRM Issues for Simultaneous DL Reception from Different Directions", 3GPP TSG-RAN WG4 Meeting #104-e, R4-2213957, 3rd Generation Partnership Project, Mobile Competence Centre, 650, Route Des Lucioles, F-06921 Sophia-Antipolis Cedex, France, vol. RAN WG4, No. Electronic Meeting, Aug. 15, 2022-Aug. 26, 2022, Aug. 10, 2022, 8 Pages, XP052282588, Section 2, Figure 1.

(Continued)

*Primary Examiner* — Janice N Tieu
(74) *Attorney, Agent, or Firm* — Loza & Loza, LLP

(57) ABSTRACT

Aspects of the disclosure provide techniques and apparatuses for improving reception of concurrent transmissions from different network entities. A user equipment may receive a first instance of a transmission in a first component carrier from a first network entity and also receive a second instance of the transmission in a second component carrier from a second network entity. The UE may then dynamically adjust a number of receivers used for the reception of the first component carrier and the reception of the second component carrier based on whether a receive time difference, between receipt of the first instance of the transmission and receipt of the second instance of the transmission, exceeds a maximum receive time difference (e.g., a cyclic prefix duration of the transmission).

24 Claims, 9 Drawing Sheets

(56) References Cited

U.S. PATENT DOCUMENTS

2020/0235871 A1* 7/2020 Kim .................. H04W 56/0045
2023/0397177 A1* 12/2023 Ioffe ....................... H04L 5/001

OTHER PUBLICATIONS

International Search Report and Written Opinion—PCT/US2023/072167—ISA/EPO—Nov. 30, 2023.

Nokia., et al, "Discussion on RRM Requirements for FR2 Multi-Rx Chain Reception", 3GPP TSG-RAN WG4 Meeting# 104-e, R4-2212688, 3rd Generation Partnership Project, Mobile Competence Centre, 650, Route Des Lucioles, F-06921 Sophia-Antipolis Cedex, France, vol. RAN WG4, No. Electronic Meeting, Aug. 15, 2022-Aug. 25, 2022, Aug. 10, 2022, 9 Pages, XP052281396, Section 2.2 Figures 1,2,3.

ZTE Corporation: "Discussion on RRM Core Requirements for Simultaneous DL Reception from Different Directions", 3GPP TSG-RAN WG4 Meeting #104-e, R4-2213872, 3rd Generation Partnership Project, Mobile Competence Centre, 650, Route Des Lucioles, F-06921 Sophia-Antipolis Cedex, France, vol. RAN WG4, No. Electronic Meeting, Aug. 15, 2022-Aug. 26, 2022, Aug. 10, 2022, 9 Pages, XP052282507, Section 2.

* cited by examiner

ENHANCEMENTS FOR NON-COLLOCATED INTRA-BAND DEPLOYMENTS

CROSS-REFERENCE TO RELATED APPLICATIONS

The present application for patent claims priority to U.S. Provisional Application No. 63/398,214, filed Aug. 15, 2022, and assigned to the assignee hereof and hereby expressly incorporated by reference herein as if fully set forth below and for all applicable purposes.

TECHNICAL FIELD

The technology discussed below relates generally to wireless communication systems, and more particularly, to techniques and apparatuses for improving reception of signals transmitted from different network entities (e.g., base stations).

BACKGROUND OF THE INVENTION

Wireless communication systems are widely deployed to provide various telecommunication services such as telephony, video, data, messaging, and broadcasts. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. In a 5G network, a network entity can transmit various signals to enable a user equipment to synchronize and connect to the network. The network entity may employ techniques to reduce network side power consumption.

SUMMARY OF THE INVENTION

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A first example provides a user equipment (UE) for wireless communication, comprising: a memory, a transceiver for wireless communication, the transceiver including a plurality of receivers, and a processor communicatively coupled to the memory and the transceiver. The processor may be configured to: (a) receive, from a first network entity, a first instance of a transmission in a first component carrier; (b) receive, from a second network entity, a second instance of the transmission in a second component carrier; and/or (c) dynamically adjust a number of receivers used for the reception of the first component carrier and the reception of the second component carrier based on whether a receive time difference, between receipt of the first instance of the transmission and receipt of the second instance of the transmission, exceeds a maximum receive time difference.

In one aspect, the first instance and second instance of the transmission may include a cyclic prefix for symbols within the transmission. A first plurality of N receivers may be used for reception of the first component carrier and reception of the second component carrier if the receive time difference is less than a duration of the cyclic prefix. A second plurality of N/2 receivers may be used for reception of the first component carrier and reception of the second component carrier if the receive time difference exceeds the duration of the cyclic prefix.

In another aspect, the first instance and second instance of the transmission includes a cyclic prefix for symbols within the transmission. A first plurality of receivers may be used for reception of the first component carrier and reception of the second component carrier if the receive time difference is less than a duration of the cyclic prefix. A second plurality of receivers may be used for reception of the first component carrier and reception of the second component carrier if the receive time difference exceeds the duration of the cyclic prefix.

In yet another aspect, the processor may be further configured to: (a) adjust a first channel state feedback information upon adjusting the number of receivers used for the reception of the first component carrier; and/or (b) send the updated first channel state feedback information to the first network entity. The processor may be configured to: (c) adjust a second channel state feedback information upon adjusting the number of receivers used for the reception of the second component carrier; and/or (d) send the updated second channel state feedback information to the second network entity. The channel state feedback information may include at least one of: a channel quality indicator (CQI), a rank indicator (RI), and a precoding matrix indicator (PMI).

In another aspect, the processor may be further configured to dynamically adjust a number of receivers used for the reception of the first component carrier and the reception of the second component carrier based on mobility state information for the UE.

In some implementations, a first plurality of receivers may be used for reception of the first component carrier and reception of the second component carrier if the mobility state information exceeds a mobility threshold. Likewise, a second plurality of receivers may be used for reception of the first component carrier and reception of the second component carrier if the mobility state information is less than the mobility threshold.

In yet another example, the processor may be further configured to: (a) establish a first time division duplex (TDD) communication link with the first network entity; and/or (b) establish a second time division duplex (TDD) communication link with the second network entity.

In another implementation, the processor may be further configured to dynamically adjust a low noise amplifier gain in a receiver chain for the first component carrier and the second component carrier based on greater power spectrums for the first component carrier and the second component carrier. The low noise amplifier gain may be adjusted during symbol reception to exclude control channel information or reference signals.

A second example provides a method for wireless communication at a user equipment (UE), comprising: (a) receiving, from a first network entity, a first instance of a transmission in a first component carrier; (b) receiving, from a second network entity, a second instance of the transmission in a second component carrier; and/or (c) dynamically adjusting a number of receivers used for the reception of the first component carrier and the reception of the second component carrier based on whether a receive time difference, between receipt of the first instance of the transmission and receipt of the second instance of the transmission, exceeds a maximum receive time difference.

A third example provides a user equipment (UE) for wireless communication, comprising: (a) means for receiving, from a first network entity, a first instance of a transmission in a first component carrier; (b) means for receiving, from a second network entity, a second instance of the transmission in a second component carrier; and/or (c) means for dynamically adjusting a number of receivers used for the reception of the first component carrier and the reception of the second component carrier based on whether a receive time difference, between receipt of the first instance of the transmission and receipt of the second instance of the transmission, exceeds a maximum receive time difference.

A fourth example provides a computer-readable storage medium stored with executable code for causing a user equipment (UE) to: (a) receive, from a first network entity, a first instance of a transmission in a first component carrier; (b) receive, from a second network entity, a second instance of the transmission in a second component carrier; and/or (c) dynamically adjust a number of receivers used for the reception of the first component carrier and the reception of the second component carrier based on whether a receive time difference, between receipt of the first instance of the transmission and receipt of the second instance of the transmission, exceeds a maximum receive time difference.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

DETAILED DESCRIPTION

Figure 1:
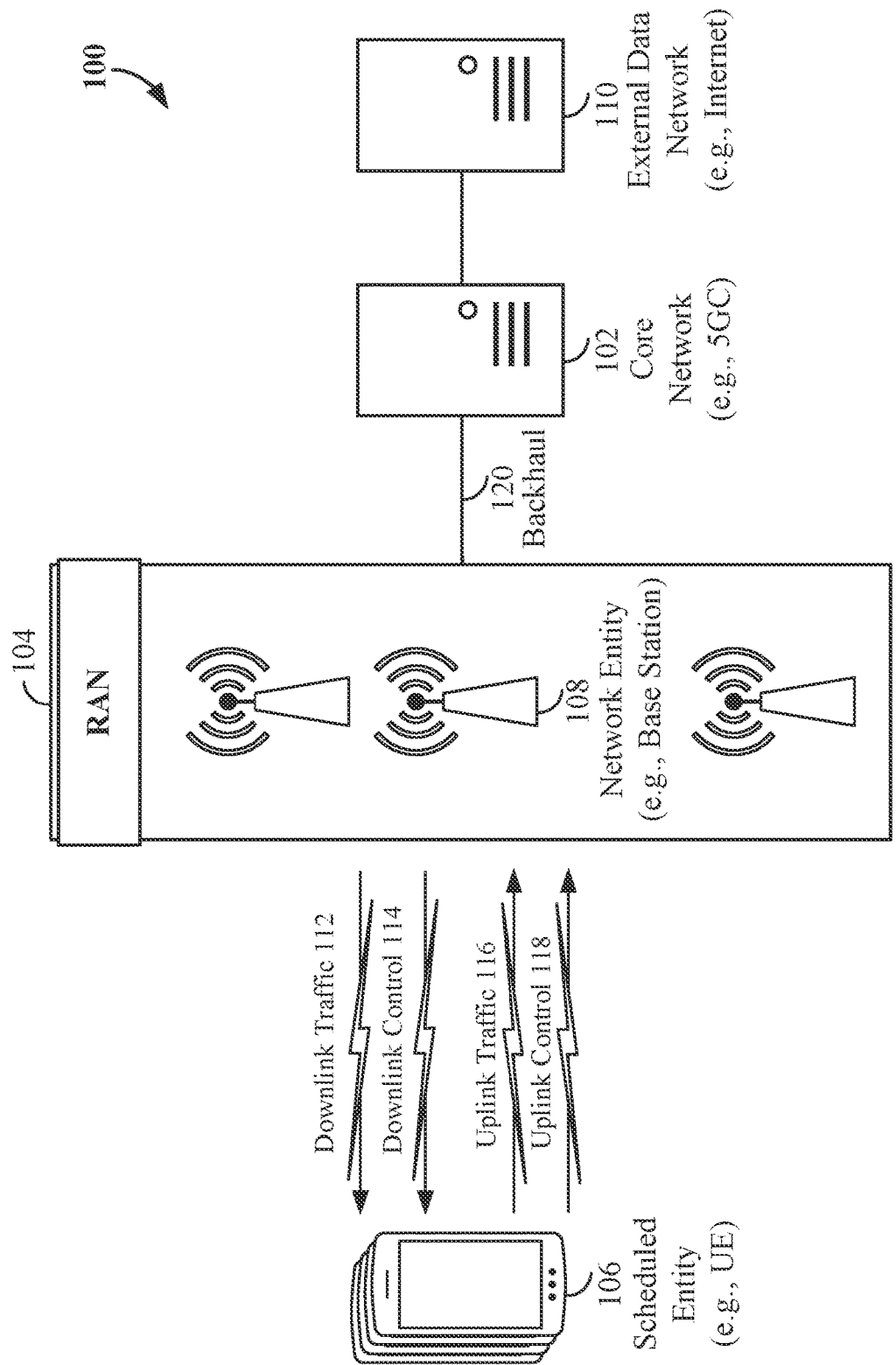
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

Aspects of the disclosure provide techniques and apparatuses for improving reception of concurrent transmissions from different network entities. A user equipment may receive a first instance of a transmission in a first component carrier from a first network entity and also receive a second instance of the transmission in a second component carrier from a second network entity. The UE may then dynamically adjust a number of receivers used for the reception of the first component carrier and the reception of the second component carrier based on whether a receive time difference, between receipt of the first instance of the transmission and receipt of the second instance of the transmission, exceeds a maximum receive time difference (e.g., a cyclic prefix duration of the transmission).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities (e.g., base stations 108). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a network entity (described further below; e.g., base station 108 or scheduling entity). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
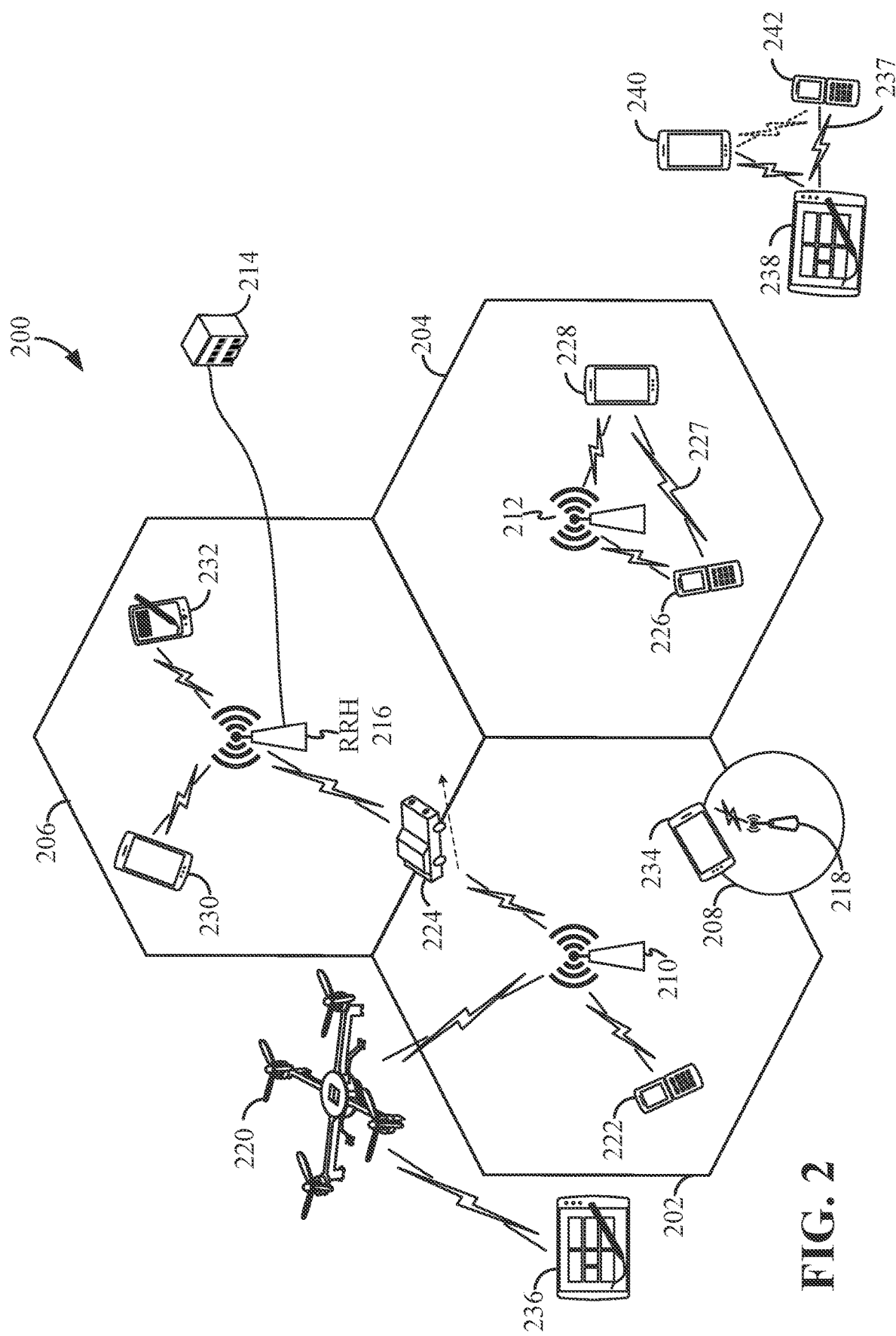
FIG. 2 is an illustration of an example of a radio access network (RAN) according to some aspects.

FIG. 2 is an illustration of an example of a RAN 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or network entity. A network entity may be implemented in an aggregated or monolithic base station architecture (e.g., gNB), or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

FIG. 2 illustrates cells 202, 204, 206, and 208, each of which may include one or more sectors (not shown). A sector is a sub-area of a cell. All sectors within one cell are served by the same network entity (e.g., a base station). A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 200 may utilize one or more multiplexing and multiple access algorithms to enable simultaneous communication of the various devices. For example, 5G NR specifications provide multiple access for UL transmissions from UEs 222 and 224 to a base station 210, and for multiplexing for DL transmissions from a base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
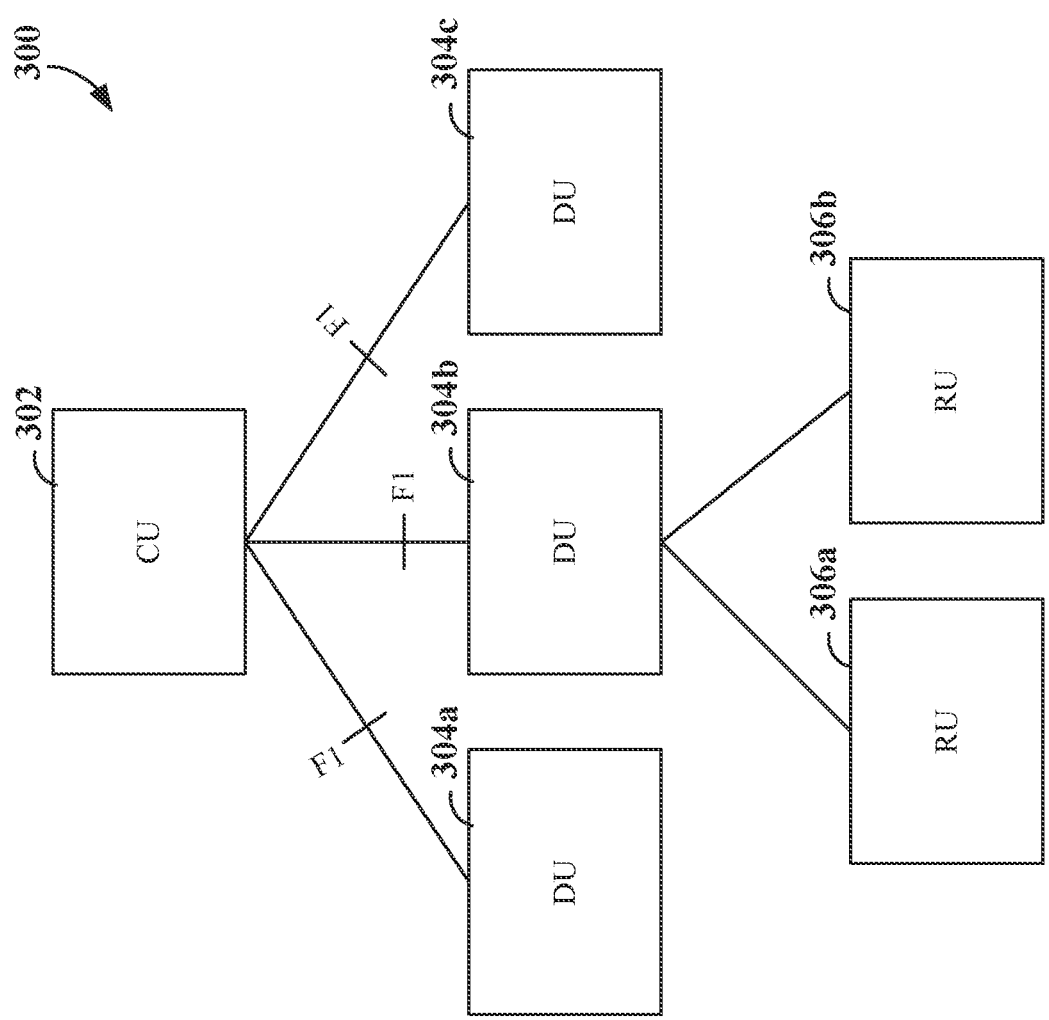
FIG. 3 is a diagram providing a high-level illustration of one example of a configuration of a disaggregated base station according to some aspects.

FIG. 3 is a diagram providing a high-level illustration of one example of a configuration of a disaggregated base station 300 according to some aspects. The disaggregated base station 300 includes a CU 302, one or more DUs (three of which, 304a, 304b, 304c, are shown for convenience), and one or more RUs (two of which 306a and 306b are shown for convenience). Each DU 304a, 304b, and 304c can support the MAC and Radio Link Control (RLC) layers of the radio protocol stack. Each RU 306a and 306b can support the PHY layer of the radio protocol stack. The CU 302 can support the higher layers, such as the Packet Data Convergence Protocol (PDCP) and RRC layers. One of the DUs (e.g., DU 304a) may be co-located with the CU 302, while the other DUs 304b and 304c may be distributed throughout a network. In addition, one of the RUs (e.g., RU 306a) may be co-located with the corresponding DU 304b, while the other RUs (e.g., RU 306b) may be distributed throughout a network. The CU 302 and DUs 304a, 304b, and 304c are logically connected via the F1 interface, which utilizes the F1 Application Protocol (F1-AP) for communication of information between the CU 302 and each of the DUs 304a, 304b, and 304c and for establishing generic tunneling protocol (GTP) tunnels between the DU and CU for each radio bearer.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
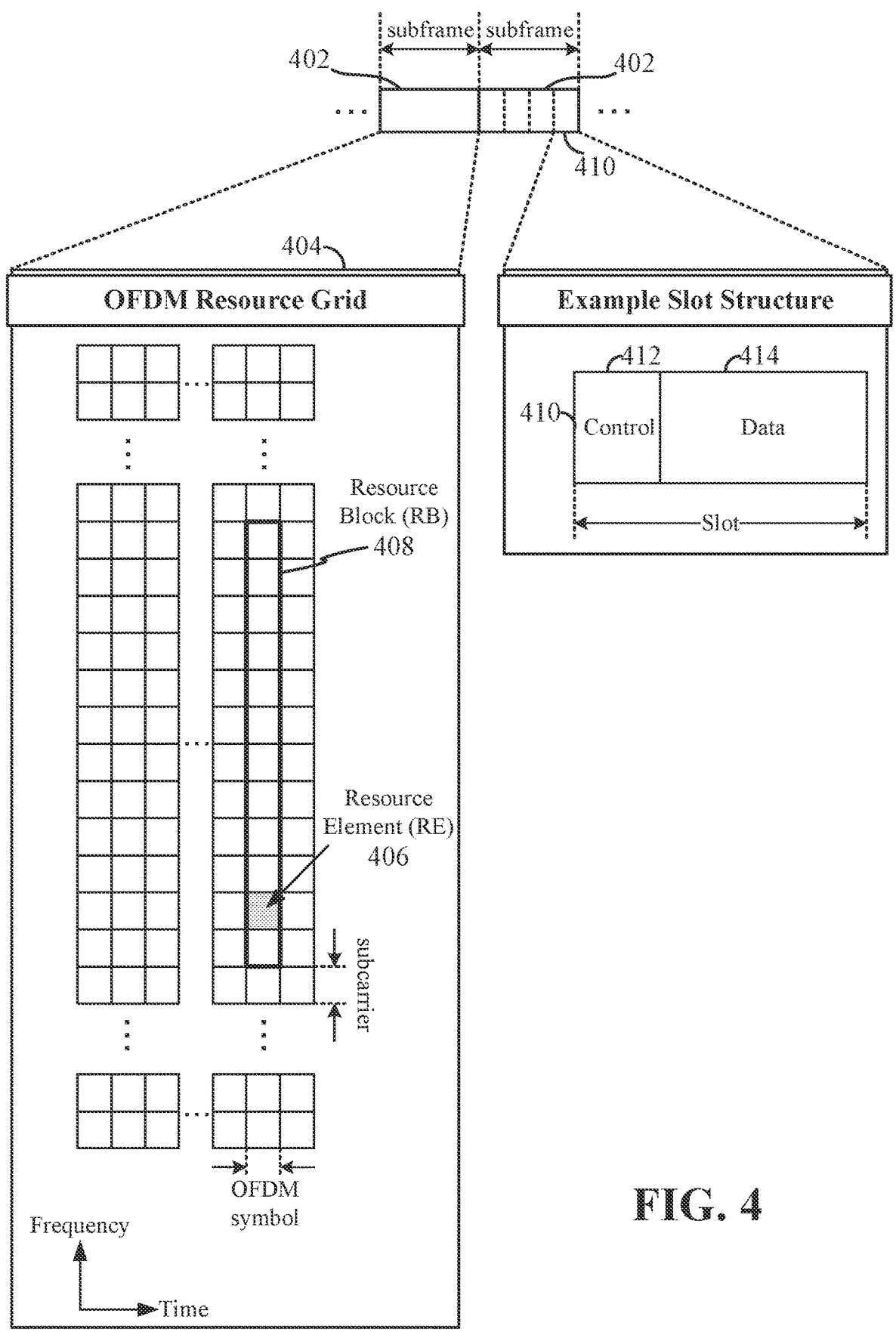
FIG. 4 is a schematic illustration of an organization of wireless resources in an air interface utilizing orthogonal frequency divisional multiplexing (OFDM) according to some embodiments.

Referring now to FIG. 4, an expanded view of an exemplary subframe 402 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity, such as a scheduling entity or a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
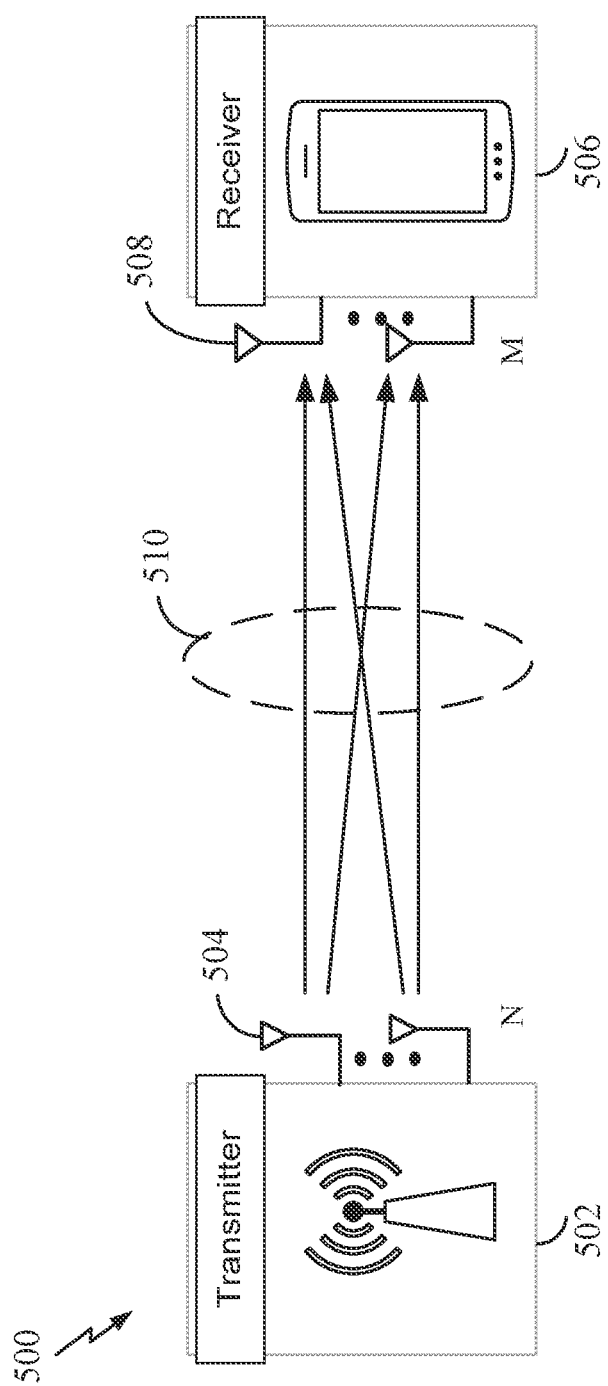
FIG. 5 is a block diagram illustrating a wireless communication system supporting multiple-input multiple-output (MIMO) communication.

In some aspects of the disclosure, the scheduling entity (e.g., a network entity) and/or scheduled entity (e.g., a UE) may be configured for beamforming and/or multiple-input multiple-output (MIMO) technology. FIG. 5 illustrates an example of a wireless communication system 500 supporting MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a network entity (e.g., scheduling entity 108), a scheduled entity 106, UE, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In 5G NR systems, particularly for FR2 (millimeter wave) systems, beamformed signals may be utilized for most downlink channels, including the PDCCH and PDSCH. In addition, broadcast control information, such as the SSB, slot format indicator (SFI), and paging information, may be transmitted in a beam-sweeping manner to enable all scheduled entities (UEs) in the coverage area of a network entity (e.g., a TRP, gNB) to receive the broadcast control information. In addition, for UEs configured with beamforming antenna arrays, beamformed signals may also be utilized for uplink channels, including the PUCCH and PUSCH. In addition, beamformed signals may further be utilized in D2D systems, such as NR sidelink or V2X, utilizing FR2.

Figure 6:
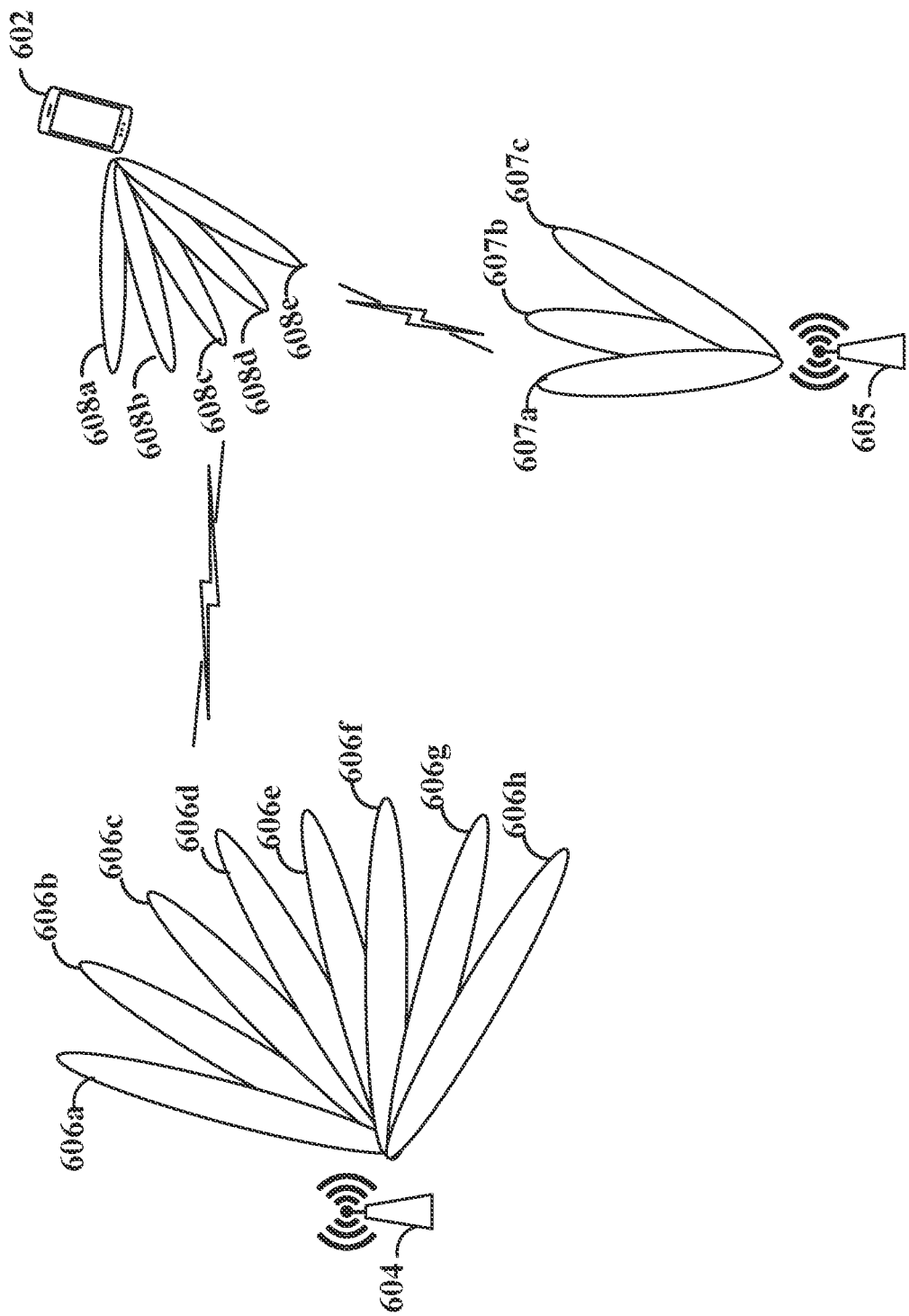
FIG. 6 is a diagram illustrating communication between a plurality of non-collated network entities and a UE according to some aspects.

FIG. 6 is a diagram illustrating communication between a plurality of network entities 604 and 605 and a UE 602 using beamformed signals according to some aspects. Each network entity 604 and 605 may be any of the scheduling entities or base stations (e.g., gNBs) illustrated in FIGS. 1 and/or 2, and the UE 602 may be any of the UEs or scheduled entities illustrated in FIGS. 1 and/or 2.

Each network entity 604 and/or 605 may generally be capable of communicating with the UE 602 using one or more transmit beams, and the UE 602 may further be capable of communicating with each network entity 604 and/or 605 using one or more receive beams. As used herein, the term transmit beam refers to a beam on the network entity 604 that may be utilized for downlink or uplink communication with the UE 602. In addition, the term receive beam refers to a beam on the UE 602 that may be utilized for downlink or uplink communication with each network entity 604 and/or 605.

In the example shown in FIG. 6, a first network entity 604 is configured to generate a plurality of transmit beams 606a-606h, each associated with a different spatial direction. Similarly, a second network entity 605 is configured to generate a plurality of transmit beams 607a-607c, each associated with a different spatial direction. In addition, the UE 602 is configured to generate a plurality of receive beams 608a-608e, each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the network entities 604 and/or 605 and UE 602 may each transmit more or less beams distributed in all directions (e.g., 360 degrees) and in three dimensions. In addition, the transmit beams 606a-606h may include beams of varying beam width. For example, the network entity 604 may transmit certain signals (e.g., SSBs) on wider beams and other signals (e.g., CSI-RSs) on narrower beams.

The first network entity 604 and UE 602 may select one or more transmit beams 606a-606h on the network entity 604 and one or more receive beams 608a-608e on the UE 602 for communication of uplink and downlink signals therebetween using a beam management procedure. Similarly, the second network entity 605 and UE 602 may select one or more transmit beams 607a-607c on the network entity 605 and one or more receive beams 608a-608e on the UE 602 for communication of uplink and downlink signals therebetween using a beam management procedure. In one example, during initial cell acquisition, the UE 602 may perform a P1 beam management procedure to scan the plurality of transmit beams 606a-606h on the plurality of receive beams 608a-608e to select a beam pair link (e.g., one of the transmit beams 606a-606h and one of the receive beams 608a-608e) for a physical random access channel (PRACH) procedure for initial access to the cell. For example, periodic SSB beam sweeping may be implemented on the network entity 604 at certain intervals (e.g., based on the SSB periodicity). Thus, the network entity 604 may be configured to sweep or transmit an SSB on each of a plurality of wider transmit beams 606a-606h during the beam sweeping interval. The UE 602 may measure the reference signal received power (RSRP) of each of the SSB transmit beams on each of the receive beams of the UE 602 and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 604 and UE 602 may perform a P2 beam management procedure for beam refinement at the network entity 604. For example, the network entity 604 may be configured to sweep or transmit a CSI-RS on each of a plurality of narrower transmit beams 606a-606h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 602 is configured to scan the plurality of CSI-RS transmit beams 606a-606h on the plurality of receive beams 608a-608e. The UE 602 then performs beam measurements (e.g., RSRP, SINR, etc.) of the received CSI-RSs on each of the receive beams 608a-608e to determine the respective beam quality of each of the CSI-RS transmit beams 606a-606h as measured on each of the receive beams 608a-608e.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h on one or more of the receive beams 608a-608e to the network entity 604. The network entity 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the network entity 604 may configure the UE 602 to perform SSB beam measurements and provide an L1 measurement report containing beam measurements of SSB transmit beams 606a-606h. For example, the network entity 604 may configure the UE 602 to perform SSB beam measurements and/or CSI-RS beam measurements for beam failure detection (BRD), beam failure recovery (BFR), cell reselection, beam tracking (e.g., for a mobile UE 602 and/or network entity 604), or other beam optimization purpose.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in the different beam directions. In addition, the network entity 604 may be configured to receive the uplink beam reference signals on a plurality of transmit beams 606a-606h. The network entity 604 then performs beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The network entity 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606d) on the network entity 604 and a single receive beam (e.g., beam 608c) on the UE may form a single BPL used for communication between the network entity 604 and the UE 602. In another example, multiple CSI-RS transmit beams (e.g., beams 606c, 606d, and 606e) on the network entity 604 and a single receive beam (e.g., beam 608c) on the UE 602 may form respective BPLs used for communication between the network entity 604 and the UE 602. In another example, multiple CSI-RS transmit beams (e.g., beams 606c, 606d, and 606e) on the network entity 604 and multiple receive beams (e.g., beams 608c and 608d) on the UE 602 may form multiple BPLs used for communication between the network entity 604 and the UE 602. In this example, a first BPL may include transmit beam 606c and receive beam 608c, a second BPL may include transmit beam 608d and receive beam 608c, and a third BPL may include transmit beam 608e and receive beam 608d.

In addition to L1 measurement reports, the UE 602 can further utilize the beam reference signals to estimate the channel quality of the channel between the network entity 604 and the UE 602. For example, the UE 602 may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The network entity (e.g., gNB) may use the CSI report to select a rank for the UE, along with a precoding matrix and a MCS to use for future downlink transmissions to the UE. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

To distinguish between the different types of reports (including CSI reports and L1 measurement reports) and different types of measurements, the network entity 604 may configure the UE 602 with one or more report settings. Each report setting may be associated with a reference signal configuration indicating a configuration of one or more reference signals (e.g., CSI-RSs) for use in generating the CSI report. In some examples, a report setting may be associated with a combined reference signal configuration.

In order to improve wireless communications, some network operators may transmit the same transmission from multiple network entities 604 and 605 to the UE 602. Carrier aggregation (CA) of the received signal transmissions may be employed at the UE 602 to more accurately decode the content therein. Carrier aggregation is a technique that is used in wireless communication to increase the transmitted data rate, whereby multiple frequency blocks (called component carriers or CC) are assigned to the same UE. The maximum possible data rate per UE is increased the more frequency blocks are assigned to a UE.

Additionally, transmissions between the network entities 604 and 605 and the UE 602 may use a cyclic prefix to prevent intersymbol interference (ISI) when an OFDM signal is transmitted in a dispersive channel. The cyclic prefix (CP) is essentially an identical copy of the last portion of the OFDM symbol appended before the OFDM symbol. This CP preserves the orthogonality of the subcarriers and prevents ISI between successive OFDM symbols.

When network entities are located near each other (e.g., collocated), multiple concurrent transmissions of the same signals will arrive at the UE 602 at approximately the same time. For instance, some operators may have multiple channels in Frequency Range 1 (FR1), covering 4.1 GHz to 7.125 GHz, which may be used for Time Division Duplex (TDD) communication bands (e.g., LTE band 42/n77/n78) in 5G. With collocated network entities, a relatively small power difference is expected between their component carriers (CCs) as received at the UE. Therefore, a small receive time difference (RTD) is expected between the CCs at the UE (e.g., basically within a duration of the CP of the transmissions).

Some network deployments in the 3.5 GHz bands have non-collocated network entities (e.g., base stations), where the network entities may be located at distant or remote locations from each other. So there is a need to aggregate carriers that are transmitted from non-collocated network entities (carrier aggregation (CA) or such as E-UTRA-New Radio Dual Connectivity (EN-DC) or New Radio Dual Connectivity (NR-DC)). However, even though network entities (e.g., base stations) are expected to be synchronous (e.g., within 3 s), when the network entities are located at different locations or non-collated (e.g., at different distances and/or directions from the UE) the receive time difference (RTD) between the CCs at the UE may be greater than an allowable maximum receive time different (MRTD). For instance, the receive time difference may exceed a duration of the CP of the transmissions. This is problematic because radio frequency front ends implementations (e.g., radio chains) for UEs use antenna and low noise amplifiers (LNA) sharing and after which a received transmission or signal is split into multiple paths so that each component carrier (CC) therein is processed separately in the baseband. In order not to impact performance, the received transmission or signals should not be distorted by the LNA. Distortion in the LNA may result from a large power spectrum density (PSD) difference between the CCs or LNA gain switching taking place during a useful part of the received signal (i.e., during the useful part of the symbol, not within the CP duration). Consequently, there is a need to support a maximum receive time difference between the received CCs that is larger than the CP duration.

Figure 7:
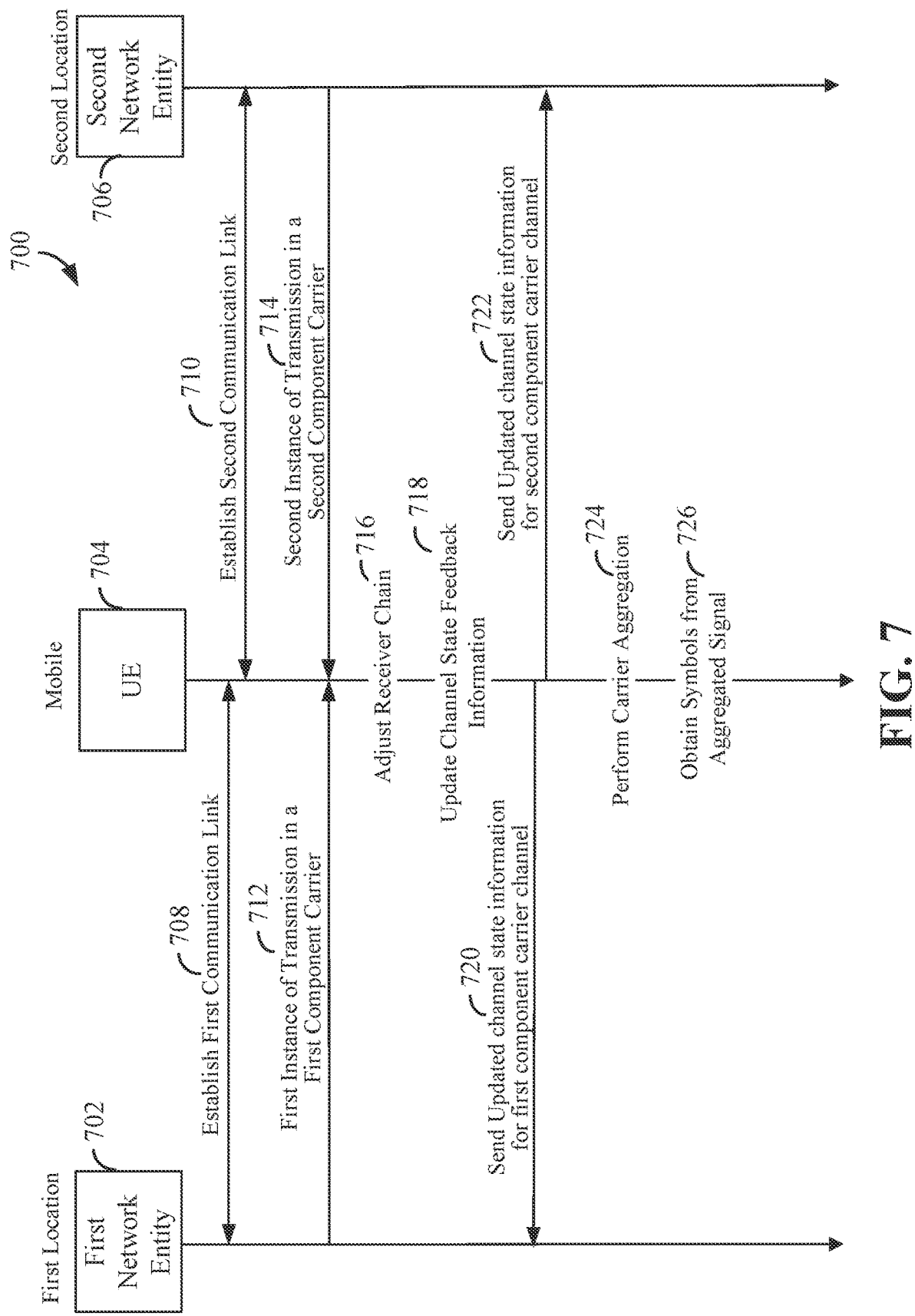
FIG. 7 is a diagram illustrating an example of a communication system in which non-collated network entities may transmit a signal to a UE that is capable of receiving the signal over different component carriers that have a receive time difference greater than a cyclic prefix duration.

FIG. 7 is a diagram illustrating an example of a communication system in which non-collated network entities may transmit a signal to a UE that is capable of receiving the signal over different CCs that have a receive time difference greater than a CP duration. A first network entity 702 and a second network entity 706 may establish separate wireless communication links 708 and 710 with a UE 704. The first network entity 702 may send a first instance of a signal transmission in a first component carrier 612 while the second network entity 706 may send a second instance of the same signal transmission in a second component carrier. Because the first network entity 702 and second network entity 706 may be located apart from each other (e.g., at different locations and/or directions relative to the UE 704), the first instance 712 and second instance 714 of the signal transmission may have a receive time difference at the receiving UE 704 that is larger than the CP duration for symbols in the signal transmission.

Additionally, because the UE 704 may be moving, e.g., toward or away from one of the network entities, the power spectrum density (PSD) of the received signal transmissions 712 and 714 may change over time.

To accommodate receive time differences that exceed the CP duration, the UE 704 may be configured to adjust a receiver chain to utilize greater or fewer receivers to receive the component carriers from the network entities.

In one approach, the UE 704 may adjust a low noise amplifier gain (LNA), e.g., LNA gain stage switch in the receiver chain, in an uplink (UL) to downlink (DL) gap in time division duplex (TDD) systems. The DL to UL gaps are expected to be frequent enough (e.g., at least every 5 ms) such that LNA gain switching is not too late. However, this approach may not work in fast fading channels which are more common with high mobility UEs.

In another approach, the UE 704 may dynamically switch or adjust the number of receivers used per CC depending on the actual receive time difference between CCs. For instance, the UE 704 may switch or adjust between four receivers per CC to two receivers per CC depending on the actual receive time difference.

If the RTD is within a CP duration for the signal transmission, then the UE 704 may use four receivers per CC. However, if the RTD is greater than the CP duration, then UE 704 may use two receivers per CC. The UE 704 may adjust or update its channel state feedback information. Such channel state feedback information may include, for example, a channel quality indicator (CQI), a rank indicator (RI), a precoding matrix indicator (PMI) for each communication link with the network entities 702 and 704. The channel state information may be sent 720 and 722 to the respective network entity 702 and 706 for each communication link or channel.

In another approach, the UE 704 may dynamically switch or adjust the number of receivers per CC used depending on the mobility state of the UE 704. For instance, if the UE 704 is high mobility (e.g., the UE is on a car or train), the UE 704 may utilize four receivers per CC. Otherwise, the UE 704 may utilize two receivers per CC.

In yet another approach, the UE 704 may dynamically adjust its low noise amplifier (LNA) gain states during reception of symbols that do not contain physical downlink control channel (PDCCH) or reference signals used for channel estimation or synchronization (DMRS, PTRS, etc.).

In yet another approach, the UE 704 may dynamically adjust its low noise amplifier (LNA) gain states during slots/symbols in which it is scheduled with lower modulation and coding scheme (MCS).

In yet another approach, the UE 704 may align the switching of its LNA gain to align with the symbol boundary of the CC with the higher received power. The lower power CC will have lower MCS so distortion impact is smaller.

The UE 704, may subsequently perform carrier aggregation (CA) 724 using the two CCs obtained, and then obtains symbols from the aggregated signal 726.

Figure 8:
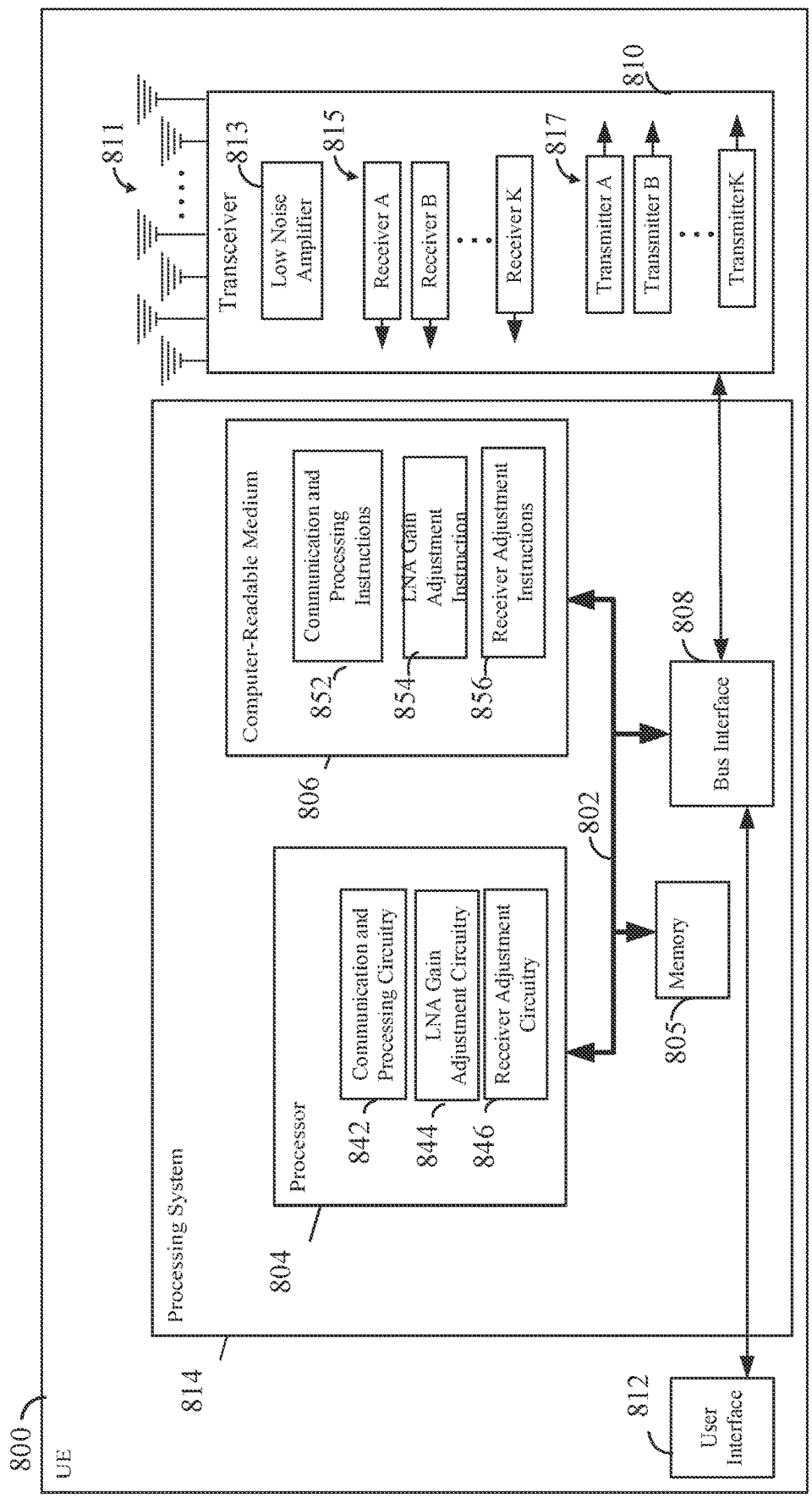
FIG. 8 is a block diagram illustrating an example of a hardware implementation for a UE employing a processing system.

FIG. 8 is a block diagram illustrating an example of a hardware implementation for a UE 800 employing a processing system 814. The UE 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may be used to implement any one or more of the processes and procedures described and illustrated in FIGS. 1-7, and 9.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples.

The transceiver 810 may include a radio chain that includes a plurality of antennas 811, a plurality of transmitters 817 and receivers 815, and a dynamically adjustable low noise amplifier (LNA) 813.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one example, the computer-readable medium 806 may include communication and processing instructions 852 and LNA gain adjustment instructions 854, and receiver adjustment instructions 856.

In some aspects of the disclosure, the processor 804 may include communication and processing circuitry 840 configured for various functions, including for example communicating with a network core (e.g., a 5G core network), scheduling entities (e.g., base stations), or any other entity, such as, for example, local infrastructure or an entity communicating with the UE 800 via the Internet, such as a network provider. In some examples, the communication and processing circuitry 840 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 840 may include one or more transmit/receive chains. In addition, the communication and processing circuitry 840 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 840 may further be configured to execute communication and processing software 850 stored on the computer-readable medium 806 to implement one or more functions described herein.

In some implementations where the communication involves receiving information, the communication and processing circuitry 840 may obtain information from a component of the UE 800 (e.g., from the transceiver 810 that receives the information via radio frequency signaling or some other type of signaling suitable for the applicable communication medium), process (e.g., decode) the information, and output the processed information. For example, the communication and processing circuitry 840 may output the information to another component of the processor 804, to the memory 805, or to the bus interface 808. In some examples, the communication and processing circuitry 840 may receive one or more of signals, messages, other information, or any combination thereof. In some examples, the communication and processing circuitry 840 may receive information via one or more channels. In some examples, the communication and processing circuitry 840 may include functionality for a means for receiving. In some examples, the communication and processing circuitry 840 may include functionality for a means for processing, including a means for demodulating, a means for decoding, etc.

In some implementations where the communication involves sending (e.g., transmitting) information, the communication and processing circuitry 840 may obtain information (e.g., from another component of the processor 804, the memory 805, or the bus interface 808), process (e.g., modulate, encode, etc.) the information, and output the processed information. For example, the communication and processing circuitry 840 may output the information to the transceiver 810 (e.g., that transmits the information via radio frequency signaling or some other type of signaling suitable for the applicable communication medium). In some examples, the communication and processing circuitry 840 may send one or more of signals, messages, other information, or any combination thereof. In some examples, the communication and processing circuitry 840 may send information via one or more channels. In some examples, the communication and processing circuitry 840 may include functionality for a means for sending (e.g., a means for transmitting). In some examples, the communication and processing circuitry 840 may include functionality for a means for generating, including a means for modulating, a means for encoding, etc.

In some aspects of the disclosure, the processor 804 may include communication and processing circuitry 842 and LNA gain adjustment circuitry 844, and receiver adjustment circuitry 846.

Figure 9:
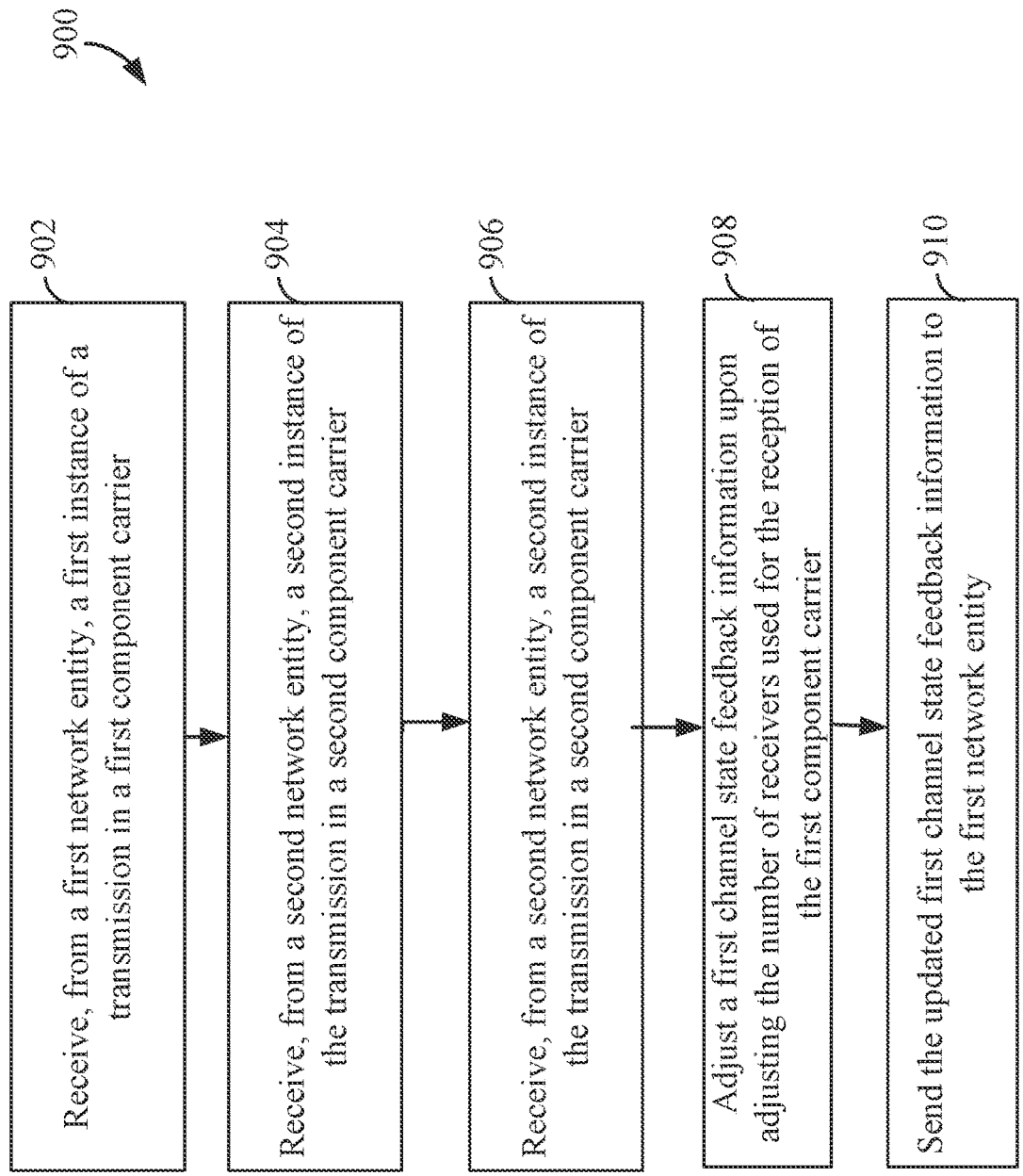
FIG. 9 is a block diagram illustrating an example of a method implemented by a UE for reception of signal transmissions.

FIG. 9 is a block diagram illustrating an example of a method implemented by a UE for reception of signal transmissions. The UE may receive, from a first network entity, a first instance of a transmission in a first component carrier 902. The UE may also receive, from a second network entity, a second instance of the transmission in a second component carrier 904. The UE may then dynamically adjust a number of receivers used for the reception of the first component carrier and the reception of the second component carrier based on whether a receive time difference, between receipt of the first instance of the transmission and receipt of the second instance of the transmission, exceeds a maximum receive time difference 906.

In one example, the first instance and second instance of the transmission includes a cyclic prefix for symbols within the transmission. The UE may use a first plurality of receivers for reception of the first component carrier and reception of the second component carrier if the receive time difference is less than a duration of the cyclic prefix. Similarly, the UE may use a second plurality of receivers for reception of the first component carrier and reception of the second component carrier if the receive time difference exceeds the duration of the cyclic prefix. The switching or adjustment of the number of receivers used for each component carrier may occur, for example, prior to reception of the component carriers. In one instance, the first plurality of receivers is N, where N is a positive integer greater than one (1), and the second plurality of receivers is N/2.

The UE may also adjust a first channel state feedback information upon adjusting the number of receivers used for the reception of the first component carrier 908 and then sends the updated first channel state feedback information to the first network entity 910. Similarly, the UE may also adjust a second channel state feedback information upon adjusting the number of receivers used for the reception of the second component carrier, and then sends the updated second channel state feedback information to the second network entity. In some examples, the channel state feedback information may include at least one of: a channel quality indicator (CQI), a rank indicator (RI), and a precoding matrix indicator (PMI).

In another exemplary implementation, the UE may dynamically adjust a number of receivers used for the reception of the first component carrier and the reception of the second component carrier based on mobility state information for the UE. For instance, a first plurality of receivers may be used for reception of the first component carrier and reception of the second component carrier if the mobility state information exceeds a mobility threshold. Otherwise, a second plurality of receivers are used for reception of the first component carrier and reception of the second component carrier if the mobility state information is less than the mobility threshold.

In some implementations, the UE may establish a first time division duplex (TDD) communication link with the first network entity, and also establish a second time division duplex (TDD) communication link with the second network entity.

In yet another implementation, the UE may also dynamically adjust a low noise amplifier gain in a receiver chain for the first component carrier and the second component carrier based on greater power spectrums for the first component carrier and the second component carrier.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
    a memory;
    a transceiver for wireless communication, the transceiver including a plurality of receivers; and
    a processor communicatively coupled to the memory and the transceiver, wherein the processor is configured to:
        receive, from a first network entity, a first instance of a transmission in a first component carrier;
        receive, from a second network entity, a second instance of the transmission in a second component carrier; and
        dynamically adjust a number of receivers used for reception of the first component carrier and reception of the second component carrier based on whether a receive time difference, between receipt of the first instance of the transmission and receipt of the second instance of the transmission, exceeds a maximum receive time difference.

2. The UE of claim 1, wherein the first instance and second instance of the transmission includes a cyclic prefix for symbols within the transmission, and
    a first plurality of N receivers is used for reception of the first component carrier and reception of the second component carrier if the receive time difference is less than a duration of the cyclic prefix; and
    a second plurality of N/2 receivers is used for reception of the first component carrier and reception of the second component carrier if the receive time difference exceeds the duration of the cyclic prefix.

3. The UE of claim 1, wherein the first instance and second instance of the transmission includes a cyclic prefix for symbols within the transmission, and
    a first plurality of receivers is used for reception of the first component carrier and reception of the second component carrier if the receive time difference is less than a duration of the cyclic prefix; and
    a second plurality of receivers is used for reception of the first component carrier and reception of the second component carrier if the receive time difference exceeds the duration of the cyclic prefix.

4. The UE of claim 1, wherein the processor is further configured to:
    adjust a first channel state feedback information upon adjusting the number of receivers used for the reception of the first component carrier; and
    send the updated first channel state feedback information to the first network entity.

5. The UE of claim 4, wherein the processor is further configured to:
    adjust a second channel state feedback information upon adjusting the number of receivers used for the reception of the second component carrier; and
    send the updated second channel state feedback information to the second network entity.

6. The UE of claim 4, wherein the first channel state feedback information includes at least one of: a channel quality indicator (CQI), a rank indicator (RI), and a precoding matrix indicator (PMI).

7. The UE of claim 1, wherein the processor is further configured to:
    dynamically adjust a number of receivers used for the reception of the first component carrier and the reception of the second component carrier based on mobility state information for the UE.

8. The UE of claim 7, wherein
    a first plurality of receivers is used for reception of the first component carrier and reception of the second component carrier if the mobility state information exceeds a mobility threshold; and
    a second plurality of receivers is used for reception of the first component carrier and reception of the second component carrier if the mobility state information is less than the mobility threshold.

9. The UE of claim 1, wherein the processor is further configured to:
    establish a first time division duplex (TDD) communication link with the first network entity; and
    establish a second time division duplex (TDD) communication link with the second network entity.

10. The UE of claim 1, wherein the processor is further configured to:
    dynamically adjust a low noise amplifier gain in a receiver chain for the first component carrier and the second component carrier based on greater power spectrums for the first component carrier and the second component carrier.

11. The UE of claim 10, wherein the low noise amplifier gain is adjusted during symbol reception to exclude control channel information or reference signals.

12. A method for wireless communication at a user equipment (UE), comprising:
   receiving, from a first network entity, a first instance of a transmission in a first component carrier;
   receiving, from a second network entity, a second instance of the transmission in a second component carrier; and
   dynamically adjusting a number of receivers used for reception of the first component carrier and reception of the second component carrier based on whether a receive time difference, between receipt of the first instance of the transmission and receipt of the second instance of the transmission, exceeds a maximum receive time difference.

13. The method of claim 12, wherein the first instance and second instance of the transmission includes a cyclic prefix for symbols within the transmission, and
   a first plurality of N receivers is used for reception of the first component carrier and reception of the second component carrier if the receive time difference is less than a duration of the cyclic prefix; and
   a second plurality of N/2 receivers is used for reception of the first component carrier and reception of the second component carrier if the receive time difference exceeds the duration of the cyclic prefix.

14. The method of claim 12, wherein the first instance and second instance of the transmission includes a cyclic prefix for symbols within the transmission, and
   a first plurality of receivers is used for reception of the first component carrier and reception of the second component carrier if the receive time difference is less than a duration of the cyclic prefix; and
   a second plurality of receivers is used for reception of the first component carrier and reception of the second component carrier if the receive time difference exceeds the duration of the cyclic prefix.

15. The method of claim 12, further comprising:
   adjusting a first channel state feedback information upon adjusting the number of receivers used for the reception of the first component carrier; and
   sending the updated first channel state feedback information to the first network entity.

16. The method of claim 12, further comprising:
   adjusting a second channel state feedback information upon adjusting the number of receivers used for the reception of the second component carrier; and
   sending the updated second channel state feedback information to the second network entity.

17. The method of claim 16, wherein the second channel state feedback information includes at least one of: a channel quality indicator (CQI), a rank indicator (RI), and a precoding matrix indicator (PMI).

18. The method of claim 12, further comprising:
   dynamically adjusting a number of receivers used for the reception of the first component carrier and the reception of the second component carrier based on mobility state information for the UE.

19. The method of claim 18, wherein
   a first plurality of receivers is used for reception of the first component carrier and reception of the second component carrier if the mobility state information exceeds a mobility threshold; and
   a second plurality of receivers is used for reception of the first component carrier and reception of the second component carrier if the mobility state information is less than the mobility threshold.

20. The method of claim 12, further comprising:
   establishing a first time division duplex (TDD) communication link with the first network entity; and
   establishing a second time division duplex (TDD) communication link with the second network entity.

21. The method of claim 12, further comprising:
   dynamically adjusting a low noise amplifier gain in a receiver chain for the first component carrier and the second component carrier based on greater power spectrums for the first component carrier and the second component carrier.

22. The method of claim 21, wherein the low noise amplifier gain is adjusted during symbol reception to exclude control channel information or reference signals.

23. A user equipment (UE) for wireless communication, comprising:
   means for receiving, from a first network entity, a first instance of a transmission in a first component carrier;
   means for receiving, from a second network entity, a second instance of the transmission in a second component carrier; and
   means for dynamically adjusting a number of receivers used for the reception of the first component carrier and the reception of the second component carrier based on whether a receive time difference, between receipt of the first instance of the transmission and receipt of the second instance of the transmission, exceeds a maximum receive time difference.

24. A non-transitory computer-readable storage medium stored with executable code for causing a user equipment (UE) to:
   receive, from a first network entity, a first instance of a transmission in a first component carrier;
   receive, from a second network entity, a second instance of the transmission in a second component carrier; and
   dynamically adjust a number of receivers used for the reception of the first component carrier and the reception of the second component carrier based on whether a receive time difference, between receipt of the first instance of the transmission and receipt of the second instance of the transmission, exceeds a maximum receive time difference.

* * * * *